United States Patent [19]

Sugiyama

[11] 4,000,465
[45] Dec. 28, 1976

[54] DIGITAL TACHOMETER

[75] Inventor: Yasumichi Sugiyama, Kyoto, Japan

[73] Assignee: Shimpo Kogyo Kabushiki Kaisha, Kyoto, Japan

[22] Filed: Apr. 25, 1975

[21] Appl. No.: 571,540

[30] Foreign Application Priority Data

| May 4, 1974 | Japan | 49-49884 |
| May 4, 1974 | Japan | 49-50797 |
| May 4, 1974 | Japan | 49-50798 |

[52] U.S. Cl. ............................ 324/166; 324/78 D; 235/92 FQ; 73/491; 235/103
[51] Int. Cl.² .......................................... G01P 3/48
[58] Field of Search .......... 324/166, 78 D; 73/529, 73/488, 491; 235/92 FQ, 95, 144 S, 144 SS, 144 SM, 103

[56] References Cited
UNITED STATES PATENTS

| 3,614,615 | 10/1971 | Cass | 324/161 |
| 3,748,580 | 7/1973 | Stevens et al. | 324/178 |
| 3,863,153 | 1/1975 | Eshraghian | 324/166 |
| 3,881,094 | 4/1975 | Taylor et al. | 235/150.2 |

FOREIGN PATENTS OR APPLICATIONS

| 1,159,935 | 7/1969 | United Kingdom | 73/529 |

*Primary Examiner*—Robert Segal
*Assistant Examiner*—Vincent J. Sunderdick
*Attorney, Agent, or Firm*—Christensen, O'Connor, Garrison & Havelka

[57] ABSTRACT

A digital tachometer provided with a measuring shaft to be brought into contact with a rotating body to be measured for simultaneous rotation therewith. As the shaft is rotated the number of rotations of the rotating object is digitally indicated and the indication remains even after the measuring shaft has been moved out of contact with the rotating object under measurement.

10 Claims, 14 Drawing Figures

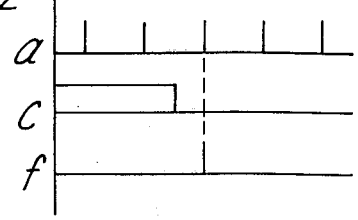
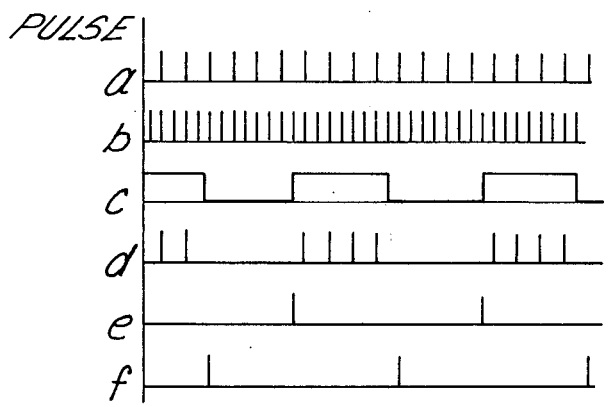
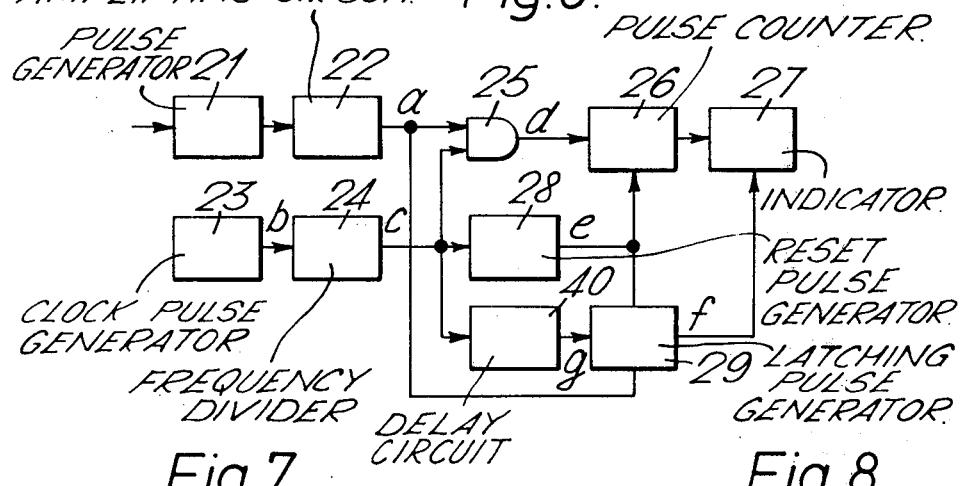
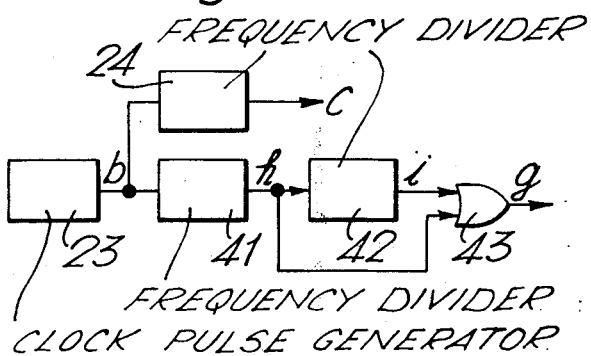
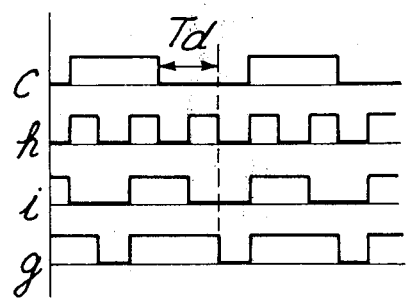

DIGITAL TACHOMETER

This invention relates to a digital tachometer and more particularly to a digital tachometer which measures and digitally indicates the number of rotations of a rotating body per unit period of time by counting the electrical pulses produced by the rotation of the body.

There is known a tachometer whch is provided with a measuring or detecting shaft adapted to be brought into contact with a rotating object for simultaneous rotation therewith. As the shaft is rotated, a series of pulses are produced, and if the pulses are counted for a unit period of time, the counted number obviously corresponds to the rotational speed of the object being tested.

In this type of tachometers, generally gate clock pulses are provided each having a width corresponding to the above-mentioned unit period of time, and these pulses and the pulses (the measurement pulses) produced by rotation of the detecting shaft are applied to an AND circuit so that the output pulses from the AND circuit are counted by a pulse counter and the counted number is measurement indicated by an indicator.

In this case, it is necessary that the pulse counter should be reset at the start of each gate clock pulse so as to be ready to count the measurement pulses when a gate clock pulse occurs. However, the counted number should be kept indicated in the indicator. To this end, one prior art arrangement has been such that a latching pulse is produced at the trailing edge of each gate clock pulse so that the latching pulse resets the indicator to cancel the previous counter number that has until then been being indicated therein and instead indicate the then counted number.

However, if the detecting shaft of the instrument is moved out of contact with the rotating object under measurement, no more measurement pulses are produced, with gate clock pulses continuing to be periodically produced. Therefore, once the pulse counter has been reset by the first gate clock pulse produced after the measuring shaft was separated from the rotating shaft, the pulse counter receives no more meausrement pulses so that the counted number remains zero. On the other hand, the indicator is also reset by the latching pulse at the trailing edge of the above-mentioned gate clock pulse, and after that the indication remains zero since the counter number of the pulse counter is zero.

Thus, in the prior art arrangement once the measuring shaft is separated from the rotating object under measurement, the indication on the indicator becomes zero. Therefore, in order to know the number of rotations of the rotating object under measurement it is necessary to read the indication while keeping the measuring shaft in contact with the rotating object. With a tachometer of a hand type, however, any obstacle about the instrument would make it impossible to look at the indicator and read the indicated counted value.

Accordingly, the primary object of the invention is to provide a tachometer of a hand type, wherein the measured value is kept indicated even after the measuring or detecting shaft has been separated from the rotating object.

Another object of the invention is to provide such a tachometer as aforesaid, wherein even after the measuring shaft has been separated from the rotating object, the measured value is kept indicated until a reset pulse is subsequently applied to cancel the indicated value.

Another object of the invention is to provide such a tachometer as aforesaid, wherein even after the measuring shaft has been separated from the rotating object, the measured value is kept indicated until the first measurement pulse produced through continued measuring operation cancels the indication.

Another object of the invention is to provide such a tachometer as aforesaid wherein even after the measuring shaft has been separated from the rotating object, the measured value is kept indicated until the power supply is cut off so as to cancel the indication.

The invention will be described in detail with reference to the accompanying drawings, wherein the same reference numerals and symbols in different figures denote corresponding parts, and wherein:

FIG. 4 is a graph showing waveforms for explanation of the operation of the arrangement of FIG. 2;

FIG. 5 is a portion of FIG. 4 enlarged along the time axis;

FIG. 6 is a block diagram of another embodiment of the invention;

FIG. 7 is a block diagram of one example of the delay circuit in FIG. 6;

FIG. 8 is a graph showing waveforms for explaining the operation of the arrangement of FIG. 7;

Figure 1:
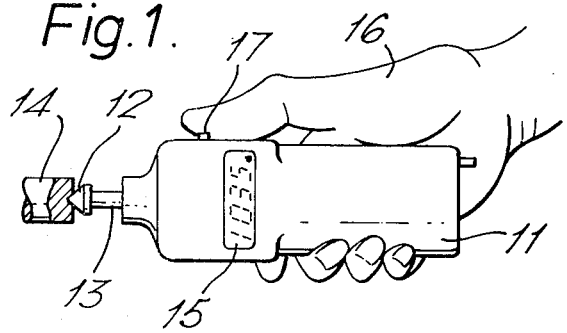
FIG. 1 is a top plan view of a digital tachometer constructed in accordance with the invention as it is being used for measurement.

Referring to FIG. 1, there is shown a digital tachometer of a hand type constructed in accordance with the invention. The instrument comprises a generally cylindrical housing 11 having a rotatable measuring shaft 13 projecting from the forward end of the housing. The shaft 13 is provided at the forward end thereof with a contact head 12 to be pressed against a rotating shaft 14 the number of rotations of which is to be measured for simultaneous rotation therewith.

On the lateral wall of the housing 11 there is formed a window 15 in which the number of rotations of the object being measured is digitally indicated. A pushbutton 17 for a source switch is provided on the wall of the housing at such a position as to enable easy manipulation hereof by a thumb of a hand 16 holding the instrument. When the button 17 is pushed with the contact head 12 being pressed against the rotating shift 14, the number of rotations of the shaft 14 is digitally indicated in the window 15.

Figure 2:
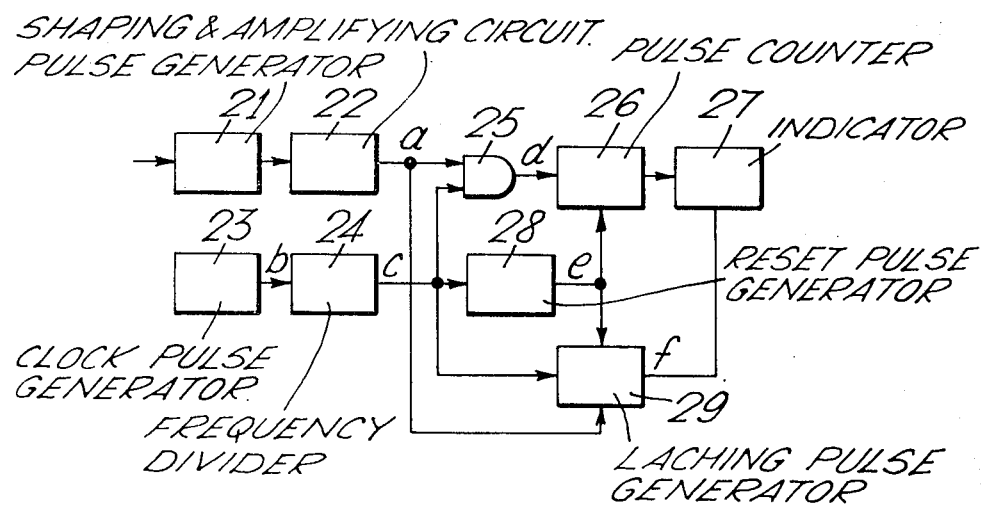
FIG. 2 is a block diagram of one embodiment of the invention.

Turning to FIG. 2, a pulse generator 21 converts the rotation of the shaft 13 to a corresponding number of pulses. The pulse generator 21 may comprise a disk which is rotated by the rotating shaft 13 and provided along the peripheral edge thereof with a plurality of small holes circumferentially spaced equidistantly from each other. A source of light and a photodetector are provided on the opposite sides of the disk so that as the disk is rotated the photodetector is intermittently illuminated by the light passing through the holes to produce the same number of pulses as that of the holes in the disk for each rotation thereof. The arrangement is well known in the art so that no further explanation will be given.

The pulses from the pulse generator 21 have their waveform properly shaped and at the same time are amplified by a shaping and amplifying circuit 22 to appear as measurement pulses $a$.

A clock pulse generator 23 comprising a quartz oscillator produces a series of clock pulses $b$ to be applied to a frequency divider 24, which appropriately divides the frequency of the clock pulses $b$ to a unit period of time for determining the measurement time.

The measurement pulses $a$ and the gate clock pulses $b$ are applied to an AND gate 25 which produces output pulses $d$ corresponding to the measurement pulses $a$ while the clock pulses $b$ are applied thereto. The pulses $d$ are counted by a pulse counter 26 and the counted number is indicated by an indicator 27 having the previously mentioned window 15.

A reset pulse generator 28 is provided to produce a pulse corresponding to the start of a unit period of time for measurement. The reset pulse generator 28 is actuated by the leading edge of the gate clock pulse $c$ to produce a reset pulse $e$. To this end, the pulse generator 28 may be composed of a differential circuit.

The reset pulse $e$ resets the pulse counter 26 to restore its count to zero and at the same time is applied to a latching pulse generator 29 to reset the same. The pulses $a$ and $c$ are applied as trigger pulses to the latching pulse generator 27 so that the generator 29 is actuated by the first measurement pulse $a$ produced after the trailing edge of each gate clock pulse $c$ to produce an output pulse $f$.

Figure 3:
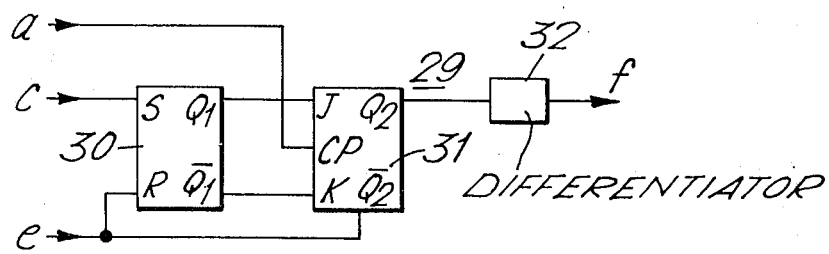
FIg. 3 is a block diagram of the latching pulse generator included in the arrangement of FIG. 1.

One example of the latching pulse generator 29 is shown in FIG. 3 comprising a flip-flop circuit 30 (first FF circuit) and a JK flip-flop circuit 31 (the second FF circuit) and a differentiator 32. When the reset pulse $e$ is applied to the pulse generator 29, the first and second FF circuits are reset so that at the first FF circuit the output of the terminal Q1 becomes "0" and the output of the terminal $\overline{Q1}$ becomes "1", while at the second FF circuit the output of the terminal Q2 becomes "0" and the output of the terminal $\overline{Q2}$ becomes "1".

When the trailing edge of the gate clock pulse $c$ is reached, the output condition of the first FF circuit is reversed so that the output of the terinal Q1 is turned to "1" and that of the terminal $\overline{Q1}$, to "0", whereupon the inputs to the terminals J and K of the second FF circuit become "1" and "0", respectively. When the first measurement pulse $a$ produced after the above reversal of the output condition of the first FF circuit is applied to the terminal CP of the second FF circuit, the output condition of the second FF circuit is reversed to change the output of the terminal Q2 to "1", whereupon the differentiator 32 produces an output pulse $f$, which is applied as a latching pulse to the indicator 27.

In short, when the first measurement pulse $a$ produced after the trailing edge of each gate clock pulse $c$ has been reached is applied to the latching pulse generator 27, the latching pulse $f$ is produced to be applied to the indicator 27.

As will be understood from the above description, the pulses $a$ produced during the period of time as defined by the duration of one gate clock pulse $c$ are counted by the counter 26, so that the counted number during the period of time corresponds to the number of revolutions of the shaft 14. The counted number is applied to the indicator 27.

When the trailing edge of the gate clock pulse $c$ is reached and the first measurement pulse thereafter is applied to the latch pulse producing circuit 29, the circuit 29 produces a latching pulse $f$ to be applied to the indicator 27 to reset the same, so that the indication that has until then been displayed in the indicator 27, that is, the previously counted number is replaced by the counted number that is being applied by the counter 26 at that time.

When the leading edge of the next gate clock pulse arrives, the reset pulse $e$ is produced to reset the pulse counter 26, the latching pulse generator 29 and the FF circuits 30 and 31 to the original condition. Thereafter, the above cycle of operation is repeated, as shown in FIG. 4. FIG. 5 shows a portion of FIG. 4 on an enlarged scale.

Suppose that while a gate clock pulse $c$ exists, the contact head 12 of the measuring shaft 13 is moved out of contact with the rotating shaft 14. From that moment on no more measurement pulse $a$ will be produced, so that no latching pulse $f$ will be produced even when the trailing edge of the gate clock pulse is reached. Also, if the head is moved out of contact with the rotating shaft 14 while no gate clock pulse exists, no latching pulse will be produced since the first FF circuit 30 of the latching pulse producing circuit 29 is not in set condition. Therefore, even if the detecting head 12 is removed out of contact with the rotating shaft 14 at any time, the indication on the indicator 27 does not disappear but remains in the window 15.

To cancel the indication, the power source may be cut off. For another measurement, the measuring head 12 may simply be pressed against the rotating shaft 14, whereupon measurement pulses $l$ are applied to the latching pulse generator 29, the output $f$ from which resets the indicator 27.

When the head 12 is moved out of contact with the rotating shaft 14, there will be no problem if the rotation of the shaft 13 is instantly stopped. However, if the detecting head 12 rotates due to inertia even after disengagement from the the rotating shaft 14, some more measurement pulses $a$ will be produced so that the latching pulse generator 29 will produce a latching pulse $f$ to reset the indicator 27 to render its indication to zero. To avoid this, a time delay may be provided between the trailing edge of the gate clock pulse and the operation of the latching pulse generator 29, so that the generator 29 will not produce an output immediately after the trailing edge of the gate clock pulse but operate a predetermined sufficient period of time thereafter for the inertial rotation of the detecting shaft to stop. FIG. 6 shows an example of such an arrangment. In FIG. 6 the same reference numerals and symbols as in the previous figures denote corresponding parts.

The gate clock pulse $c$ is applied to a delay circuit 40, which produces an output $g$ which continues a predetermined period of time after the trailing edge of the pulse $c$. The output $g$ is applied to the latching pulse producing circit 29, so that when the trailing edge of the pulse g is reached, the circuit 29 procudes a latching pulse f to reset the indicator 27.

One example of the delay circuit is shown in FIG. 7, comprising two frequency dividers 41 and 42 and an OR circuit 43. The delay circuit may also comprise a monostable circuit.

If the frequency divider 24 produces a gate clock pulse c having a pulse width corresponding to n clock pulses b, with the duty factor thereof being one-half, the frequency divider 41 is so designed as to produce an output pulse h having a pulse width corresponding to n/3 clock pulses b, with the duty factor thereof being one-half; and the frequency divider 42 is so designed as to produce an output pulse i having a pulse width corresponding to twice that of the pulse h, with the duty factor thereof being one-half.

The pulses h and i are applied to an OR circuit 43, which produces an output g.

FIG. 8 shows waveforms for explanation of the above operation. As can be easily understood, the trailing edge of the output pulse g is delayed two-thirds of the width of the gate clock pulse c after the trailing edge of the pulse c. The period of time Td is used as the previously mentioned delay time provided by the delay circuit 40.

The operation of the circuit of FIG. 6 in other respects is the same as in FIG. 2. In the arrangement of FIG. 6, even if the detecting shaft 13 is rotated by inertia after disengagement of the shaft 13 from the rotating shaft 14 to produce measurement pulses a, the indicator 27 is not reset but remains with its indication.

Figure 9:
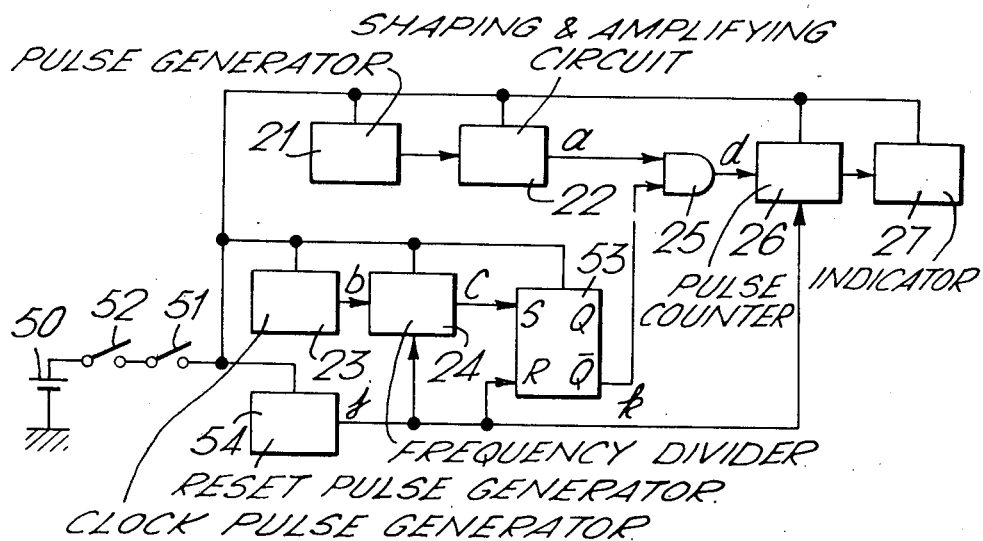
FIG. 9 is a block diagram of another embodiment of the invention.

In the above embodiments, a plurality of gate clock pulses c are produced in succession. The object of this invention can be achieved by the arrangement that a single gate clock pulse is produced and the measurement pulses produced during the single gate clock pulse are counted to indicate the counted number so that the indication continues until the source circuit is cut off. FIG. 9 shows a block diagram of this arrangement. A battery or cell 50 is enclosed in the housing 11 of the instrument to supply an operating voltage to the component circuits through a series of switches 51 and 52. The switch 51 is closed by pressing the previously mentioned push-button 17 shown in FIG. 1. The operation of the other switch 52 will be explained presently.

In the embodiment of FIg. 9, the output pulse k at the terminal $\overline{Q}$ of a flip-flop circuit 53 (to be abbreviated to an FF circuit) is used as the gate clock pulse.

The pulse c from the frequency divider 24 is used as the set input to be applied to the input terminal S of the FF circuit 53 in such a manner that the trailing edge of the pulse c sets the FF circuit 53, whereupon the output k at the terminal $\overline{Q}$ of the FF circuit 53 is removed, that is to say, the trailing edge of the pulse k is reached.

A reset pulse generator 54 provides a reset pulse to be applied to the reset input terminal R of the FF circuit 53. When the switch 51 is closed, so that the voltage of the cell 50 is applied to the circuit 54, a pulse i is produced. A monostable circuit can be used as the generator 54. When the trailing edge of the pulse j has been reached, the FF circuit 53 is reset, whereupon the output pulse k is produced at the terminal $\overline{Q}$ of the Ff circuit 53. The pulse k is applied to one input of the AND element 25, to the other input of which the measurement pulses a are applied. The pulse j also resets the frequency divider 24.

When the switch 51 is closed with the detecting head 12 being pressed against the rotating shaft 14 (at this time the start switch 52 is also closed), the source 50 is connected to the component circuits of the instrument. Upon closure of the switch 51 the clock pulses b produced by the generator 23 are applied to the frequency divider 24, which produces an output pulse c having a width or duration corresponding to a predetermined unit period of time. However, the closure of the switch 51 causes the circuit 54 to produce a reset pulse j, the trailing edge of which resets the frequency divider 24 to produce an output pulse c. In otherwords, when the frequency divider 24 is reset, it starts its operation from the first even if it is in the middle of its operation.

On the other hand, the trailing edge of the pulse j resets the FF circuit 53, so that the circuit 53 produces an output pulse k at the terminal $\overline{Q}$. When the pulse c terminates after a predetermined period of time, the trailing edge of the pulse c sets the FF circuit 53, thereby terminating the output pulse k at the terminal $\overline{Q}$. Thereafter no output pulse d will be produced by the AND circuit 25.

Thus, after the first single gate clock pulse k from the FF circuit 53 has terminated, the FF circuit will not produce any more pulse k despite the set input pulses c being applied to the terminal S unless the FF circuit 53 is again reset. In other words, after the first single pulse k has been produced by closing the switch 51, no more pulses k will be produced.

The pulse counter 26 which has been reset by the trailing edge of the pulse j and counted the pulses d during the existence of the single pulse k will not be reset again, so that its count and consequently the indication remains in the indicator 27. In other words, even if the detecting head 12 has been removed out of contact with the rotating shaft 14 under test, the indication remains in the indicator 27.

Figure 10:
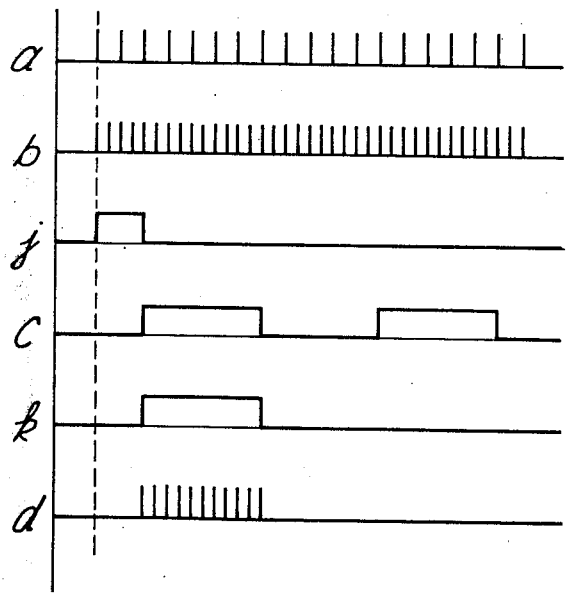
FIG. 10 is a graph showing waveforms for explaining the operation of the arrangement of FIG. 9.

Only when the switch 51 is opened after reading the indicated value, the component elements are disconnected from the source 50 so that the indication is cancelled. FIG. 10 shows the waveforms for explanation of the operation of the arrangement of FIG. 9.

In the above arrangement, it is required that the frequency divider 24 is reset by the trailing edge of the reset pulse j to produce the pulse c. Generally, frequency dividers are composed of a plurality of flip-flop circuits connected in several stages, so that it sometimes is difficult to reset all these flip-flop circits at the same time. If all the flip-flop circuits are not simultaneously reset, the frequency divider 24 cannot produce any pulse c having a pulse width corresponding to the required unit period of time.

Figure 11:
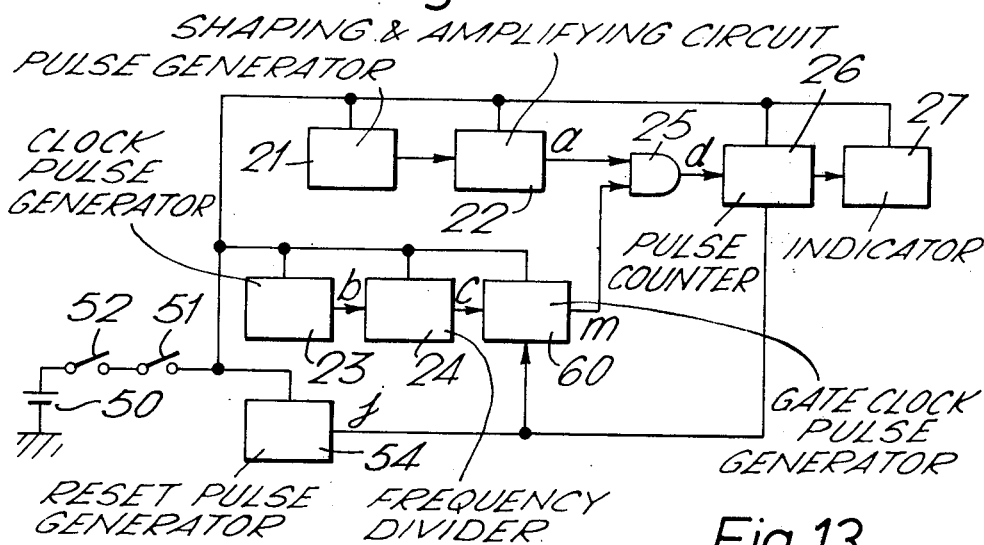
FIG. 11 is a block diagram of still another embodiment of the invention.

FIG. 11 shows an arrangement for overcoming the above defect, wherein it is not necessary to reset the frequency divider 24. A gate clock pulse generator 60 is so designed that upon termination of the pulse c from the frequency divider 24 after the generator 60 was reset by the trailing edge of the reset pulse j, the generator 60 produces an output m, which lasts till the trailing edge of the next pulse c is reached. The cycle of the pulses c is set to the unit period of time and the duty factor thereof is set to one-half.

Figure 13:
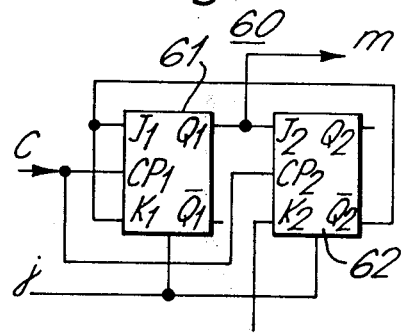
FIG. 13 is a block diagram of one example of the gate clock pulse generator in FIG. 11.

One example of the gate clock pulse generator 60 is shown in FIG. 13 comprising two JK flip-flop circuits 61 and 62 (which will be referred to as the first and second FF circuits, respectively). Both the FF circuits are reset by the trailing edge of the reset pulse j, so that the output at terminal Q1 is rendered "0"; the output at the terminal $\overline{Q1}$ is rendered "1"; the output at the terminal Q2 is rendered "0"; and the output at the terminal $\overline{Q2}$ is rendered "1" output at the terminal $\overline{Q2}$, the inputs to the terminals J1 and K1 of the first FF circuit 61 become "1", and since the output at the terminal Q1 is "0", the input to the terminal J2 of the second FF circuit 62 becomes "0". The input to the terminal K2 of the second FF circuit 62 is always kept "0".

After the FF circuits 61 and 62 have been reset in the above manner, when the trailing edge of the first pulse c (which will be referred to as the first pulse P1, and the secnd pulse c, as the second pulse P2) has been reached, the first FF circuit 61 alone is reversed to turn the output at the terminal Q1 to "1" and the output at the terminal $\overline{Q1}$ to "0", so that the input to the terminal J2 becomes "1". At this moment the pulse m is produced. Then the second pulse P2 is applied to the circuit 60, and when the trailing edge of this second pulse is reached, the two FF circuits 61 and 62 are both reversed so that the output at the terminal Q1 becomes "0", the output at the terminal $\overline{Q1}$ becomes "1", the output at the terminal Q2 becomes "1" and the output at the terminal $\overline{Q2}$ becomes "0". In otherwords, all the inputs to the terminals J1, K1, J2 and K2 become "0", and the pulse m terminates due to the output at the terminal Q1 having become "0".

After that even when any further pulse c is applied to the FF circuits 61 and 62 neither of them will be reversed. Thus, the output pulse m has a width equal to the period of time from the traling edge of the first pulse P1 to that of the second pulse P2, that is, one cycle of the pulse c or the previously mentioned unit period of time.

Figure 14:
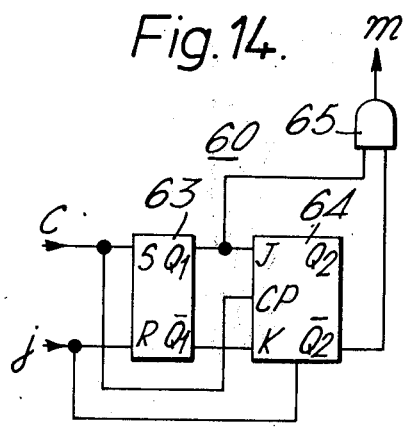
FIG. 14 is a block diagram of another example of the gate clock pulse generator in FIG. 11.

FIG. 14 shows another example of the gate clock pulse generator 60. Here, the circuit 60 comprises an RS flip-flop circuit 63 (to be referred to as the first FF circuit), a JK fli-flop circuit 64 (to be referred to as the second FF circuit) and an AND circuit 65. The pulse m is the output from the AND circuit 65.

In this arrangement, at the end of the reset pulse j, both the first and second FF circuits 63 and 64 are reset, so that the output at the terminal Q1 becomes "0" and the output at the terminal $\overline{Q2}$ becomes "1". When the first pulse P1 is applied and terminates, the first FF circuit 63 alone is reversed so that the output at the terminal Q1 becomes "1" while the output at the terminal $\overline{Q1}$ becomes "0", whereupon the output pulse m is produced through the AND element 65.

When the second pulse P2 is then applied and terminates, the second FF circuit 64 alone is reversed, so that the output at the terminal $\overline{Q2}$ is turned to "0," whereupon the output m from the AND element 65 terminates, that is to say, the trailing edge of the pulse m is reached.

After that, even if any further pulse c is applied to the circuit 60, neither of the FF circuits 63 and 64 will be reversed. Thus, the output pulse m from the AND element 65 has a width equal to the period of time from the trailing edge of the first pulse P1 to that of the second pulse P2.

Figure 12:
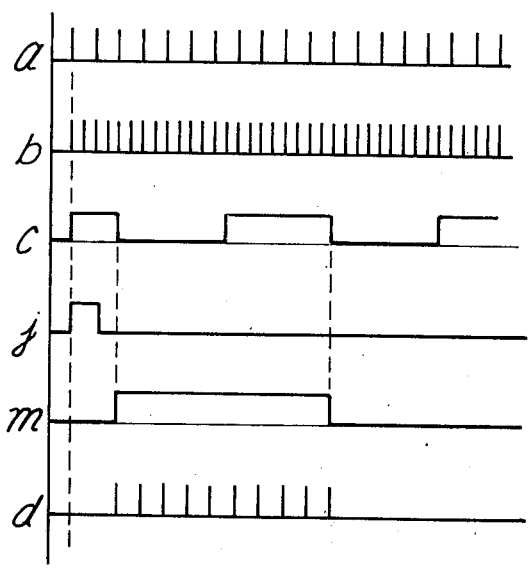
FIG. 12 is a graph showing waveforms for explaining the operation of the arrangement of FIG. 11.

FIG. 12 shows the waveforms of the various pulses in the arrangement of FIG. 11 for explanation of the operation thereof. Since the frequency divider 24 need not be reset when the trailing edge of the reset pulse j is reached, the gate clock pulse m has a width strictly equal to the unit period of time.

What I claim is:

1. A digital tachometer comprising: measuring means for removable engagement with a rotating object for producing a predetermined number of measurement pulses per rotation of such object when engaged therewith; clock pulse generator means for producing a gate clock pulse having a pulse width corresponding to a predetermined unit period of time; logic gate means for producing output pulses corresponding to said measurement pulses produced by said measurement pulse producing means during the period of time that said gate clock pulse exists; counting means for counting said output pulses from said logic gate means, and means for resetting said counting means; indicator means for displaying the count registered by said counting means when said measuring means is engaged with said object; and means for causing said indicator means to continue to display said count when said measuring means has been disengaged from said object.

2. The digital tachometer of claim 1, whereinsaid clock pulse generator means produces a succession of said gate clock pulses and said means for resetting said counting means is operative at the beginning of each said gate clock pulses so that said counting means registers a succession of counts one for each of said gate clock pulses; and said means for causing said indicator means to continue to display the first mentioned said count includesmeans for operating said indicator means to display each succeeding new count registered on said counting means only when one of said measurement pulses occurs after the termination of the gate clock pulse that gave rise to said each succeeding new count.

3. The digital tachometer of claim 2, wherein said means for operating said indicator means is responsive to the first measurement pulse produced after termination of each said gate clock pulse.

4. The digital tachometer of claim 2, wherein said means for resetting said counting means is operative at the beginning of said gate clock pulse.

5. The digital tachometer of claim 2, wherein said means for operating said indicator means is responsive to the first measurement pulse that is produced after a predetermined delay time following termination of each said gate clock pulse and before production of the next gate clock pulse.

6. The digital tachometer of claim 1, wherein said means for causing said indicator means to continue to display said count comprises means for operating said clock pulse generator means to produce only one gate clock pulse when said measuring means is engaged with said object, whereby said counting means registers and said indicator means displays the count that occurred during said one gate clock pulse even though said measuring means is subsequently disengaged from said object.

7. The digital tachometer of claim 6, wherein said clock pulse generator means and said means for operating it comprise means operable in response to actuation of a manually actuated source circuit that operates to produce a reset pulse, and flip-flop circuit means so arranged as to be reset by said reset pulse and set upon passage of said predetermined unit period of time after said reset pulse, so that the reset output from said flip-flop circuit means produces said one gate clock pulse in response to actuation of said source circuit when said measuring means is engaged with said object.

8. The digital tachometer of claim 7 wherein said means for resetting said counting means is responsive to said reset pulse.

9. The digital tachometer of claim 6, wherein said clock pulse generator means and said means for operating it comprise: a frequency divider the output pulses from which have a cycle corresponding to said predetermined unit period of time and a duty factor of one-half; means operable in response to actuation of a manually actuated source circuit to produce a reset pulse; and means for producing as said gate clock pulse an output pulse having a width commencing with the trailing edge of the first output pulse from said frequency divider after production of said reset pulse and extending to the trailing edge of the second output pulse from said frequency divider.

10. The digital tachometer of claim 9, wherein said means for resetting said counting means is responsive to said reset pulse.

* * * * *